United States Patent
Ho

(10) Patent No.: US 7,178,053 B2
(45) Date of Patent: Feb. 13, 2007

(54) COMPUTER SYSTEM DATA RESTORING DEVICE AND THE METHOD FOR RESTORING COMPUTER SYSTEM DATA USING THE SAME

(76) Inventor: Ming-Chiao Ho, P.O. Box No. 6-57, Junghe, Taipei 235 (TW)

( * ) Notice: Subject to any disclaimer, the term of this patent is extended or adjusted under 35 U.S.C. 154(b) by 506 days.

(21) Appl. No.: 10/624,470

(22) Filed: Jul. 23, 2003

(65) Prior Publication Data

US 2005/0022055 A1    Jan. 27, 2005

(51) Int. Cl.
*G06F 11/00* (2006.01)
(52) U.S. Cl. .................................. 714/5; 714/11
(58) Field of Classification Search .............. 714/5, 714/11, 13
See application file for complete search history.

(56) References Cited

U.S. PATENT DOCUMENTS 6,707,748 B2 * 3/2004 Lin et al. .................. 365/228
2003/0050940 A1 * 3/2003 Robinson ................... 707/204
2003/0088720 A1 * 5/2003 Fukuzawa et al. ............ 710/65

* cited by examiner

*Primary Examiner*—Dieu-Minh Le
(74) *Attorney, Agent, or Firm*—Birch, Stewart, Kolasch, and Birch, LLP

(57) ABSTRACT

A computer system data restoring device and a method for restoring computer system data using the same are disclosed. The computer system data-restoring device includes a casing, a plurality of function keys and a circuit device. The circuit device has a central processing unit (CPU), a connection port, a memory, a connection interface, a controller integrated circuit and a data storage device. The circuit device is electrically connected with the function keys, and is connected to an external computer host via the connection port for controlling the function keys that further control operations of the controller integrated circuit, thereby activating corresponding software in the computer host via the CPU and the connection port to store the computer host data into the restoring device, or to restore the computer system data stored in the restoring device to the external computer host.

8 Claims, 4 Drawing Sheets

COMPUTER SYSTEM DATA RESTORING DEVICE AND THE METHOD FOR RESTORING COMPUTER SYSTEM DATA USING THE SAME

BACKGROUND OF THE INVENTION (a) Field of the Invention

The invention relates to a computer system data restoring device and a method for restoring computer system data using the same. More particularly, the invention relates to a device having backup and restoring computer data functions, and the method for restoring computer system data using the same.

(b) Description of the Prior Technology

In a conventional computer, a hard disk thereof is installed at an interior of a computer host thereof. For computer users who are unfamiliar with computer hardware structures, for example, computer novices, average users, ordinary housekeepers, children and senior citizens, it is obligatory that the entire computer host is sent for maintenance once difficulties arise regarding the hard disk. The valuable data are often lost as the results of computer system's abnormal operations and computer system crashes due to the following reasons:
1) Improper operations.
2) Presence of computer viruses.
3) Inappropriate software designs.
4) Other unexpected reasons such as sudden power failures.
5) Non-hardware reasons namely bugs of software applications, viruses, or carelessness of users.

Also, the computer host has poor mobility for being bulky and heavy, and thus often causes users agony as well as inconveniences.

SUMMARY OF THE INVENTION

In the view of the aforesaid shortcomings of the prior structure, the primary object of the invention is to provide a computer system data restoring device and a method for restoring computer system data using the same. The restoring device can be externally connected to a computer host, and hard disk data backup is stored in the restoring device. When situations arise in the hard disk, the computer data stored in the restoring device can be restored back into the computer host.

The secondary object of the invention is to provide a computer system data restoring device and a method for restoring computer system data using the same, which are coordinated with a human monitor selection table to facilitate selections for users.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

To better understand the characteristics, objects and functions of the invention, detailed descriptions shall be given with the accompanying drawings hereunder.

Figure 1:
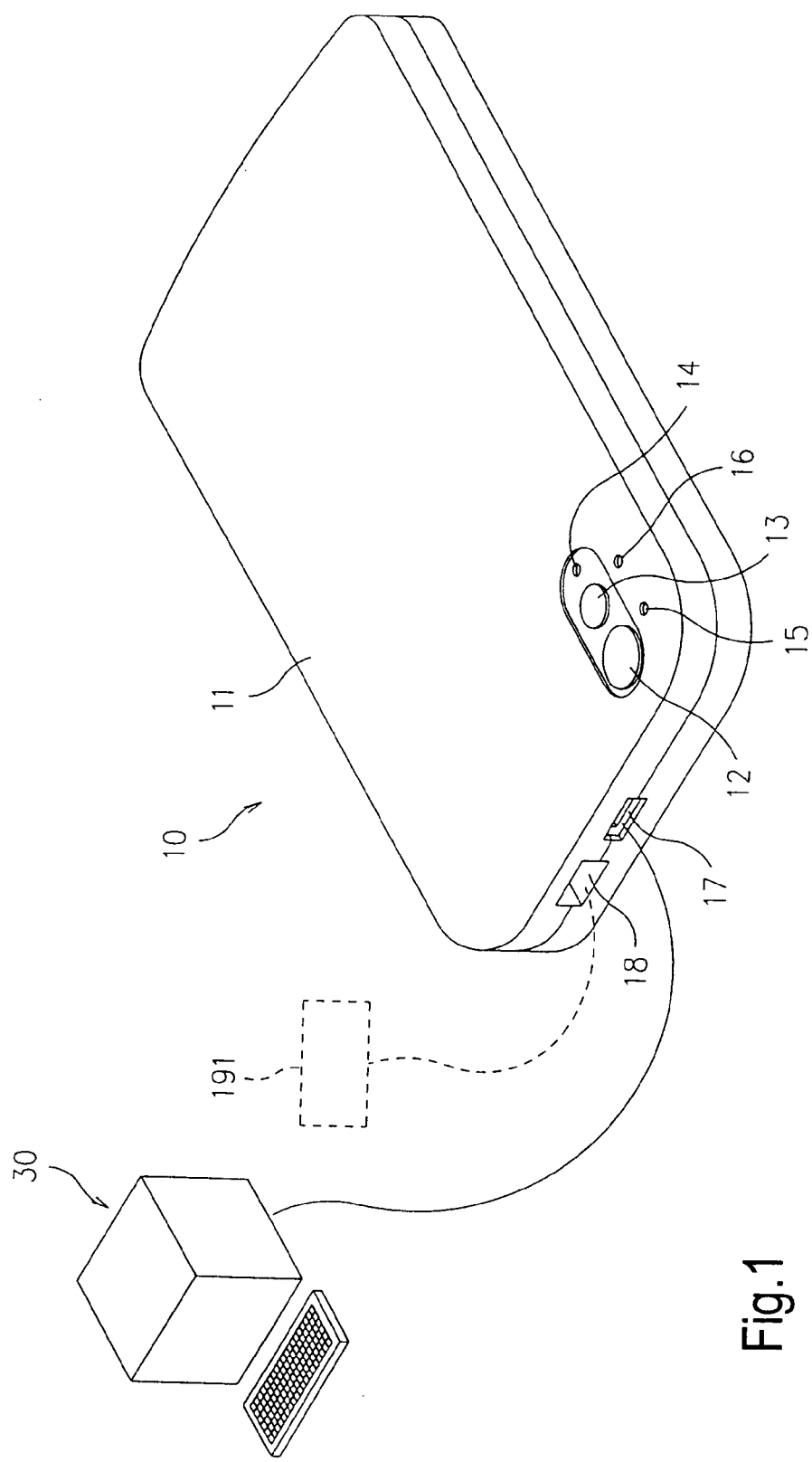
FIG. 1 shows an elevated view of a preferred embodiment according to the invention.
Figure 2:
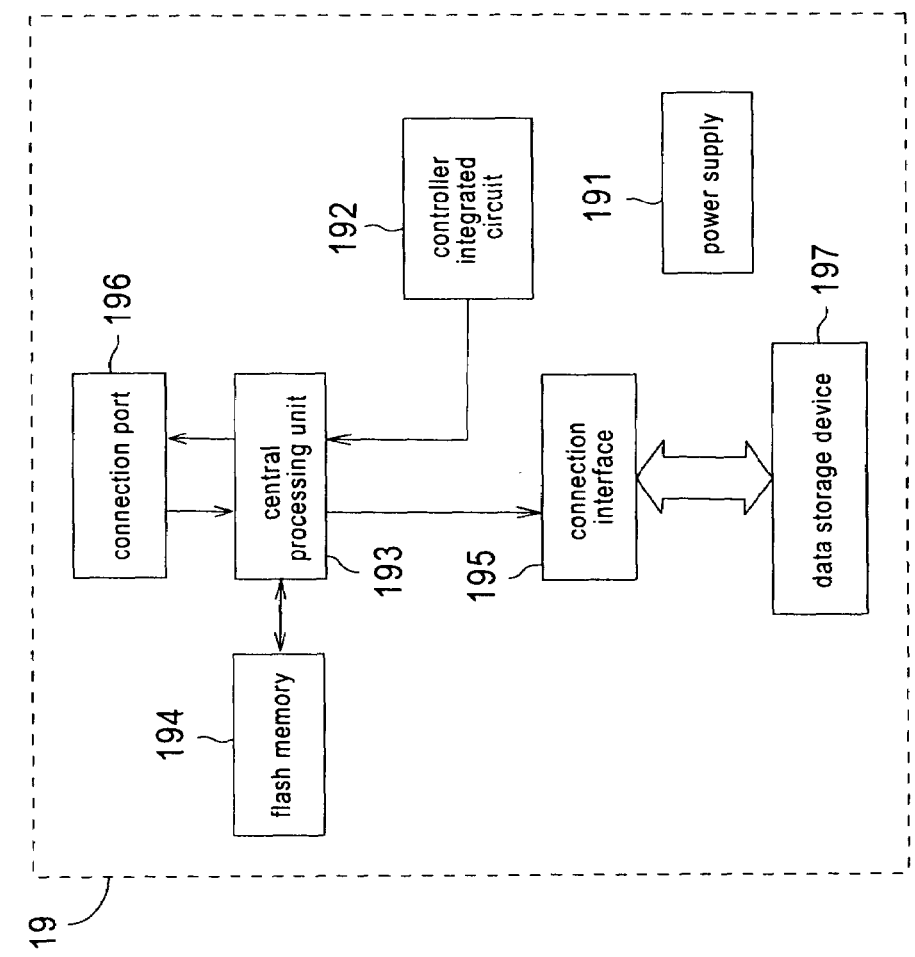
FIG. 2 shows a block diagram of a circuit according to the invention.

Referring to FIGS. 1 and 2, a computer system data-restoring device 10 according to the invention comprises:
a casing 11;
a quick backup key 12, a complete backup key 13 and a restoring key 14, all disposed on the casing 11 and for coordinating with a power indication display 15 and a data access indication display 16;
a serial interface socket 17;
a direct current (DC) power plug 18; and
a circuit device 19 disposed in the casing 11, and having a central processing unit (CPU) 193, a memory 194, a connection interface 195, a controller integrated circuit 192, a data storage device 197; wherein:
the circuit device 19 is electrically connected with a power supply 191 and a connection port 196; the connection port 196 has a socket 17 disposed at an appropriate position on the casing 11 so as to provide insertion of a plug corresponding to the connection port 196, which can be a Universal Serial Bus (USB) interface, IEEE 1394 serial interface, or super advanced technology attachment/advance technology attachment packet interface (SATA/ATAPI) interface; the data storage device 197 can be a hard disk, or a optical drive having a storage device with an ATA/ATAPI interface; and the connection interface 195 is a common ATA/ATAPI interface, which is a common hard drive and a optical drive interface, and is also a standard interface connecting computer peripherals. The data storage device 197 can also be flash memory card, including CompactFlash, Smart Media, SecureDigital, MultiMedia, Memory Stick, and Extreme Digital Cards, with its own proprietary interface.

By connecting the connection port 196 to a computer host 30, the function keys 12, 13 and 14 on a panel of the device are able to control operations of the controller integrated circuit 192. Corresponding software in the computer host is activated through the CPU 193 and the connection port 196, so as to process and store the data from the computer host into the data storage device 197, or to restore the computer data stored in the data storage device 197 to an external computer host. In addition, the casing 11 is provided with the indication display 15 for indicating whether power is conducted, and another indication display 16 for indicating access of the restoring device 10 and the computer host 30.

Figure 3:
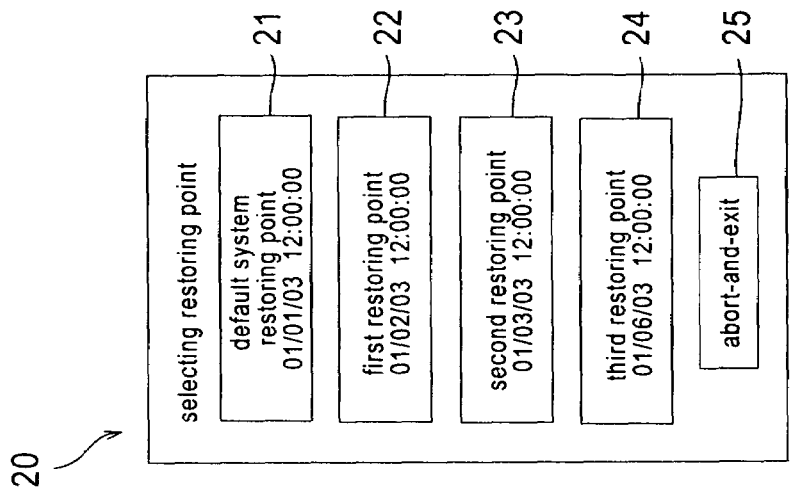
FIG. 3 shows a schematic view of a selection table displayed on a computer monitor.

Referring to FIG. 3, to offer simple operations, a human monitor selection table 20 is provided for facilitating selections of users. The selection table 20 has selection items including a default system restoring point 21, a first restoring point 22, a second restoring point 23, a third restoring point 24, and an abort-and-exit 25. When the restoring device 10 is connected with the computer host 30 and operates under normal circumstances when powered on, the selection table 20 is displayed on the monitor by pressing the restoring key 14. Moreover, timings of restore are also shown for users to quickly select from the restoring items, or to abort and exit.

Figure 4A:
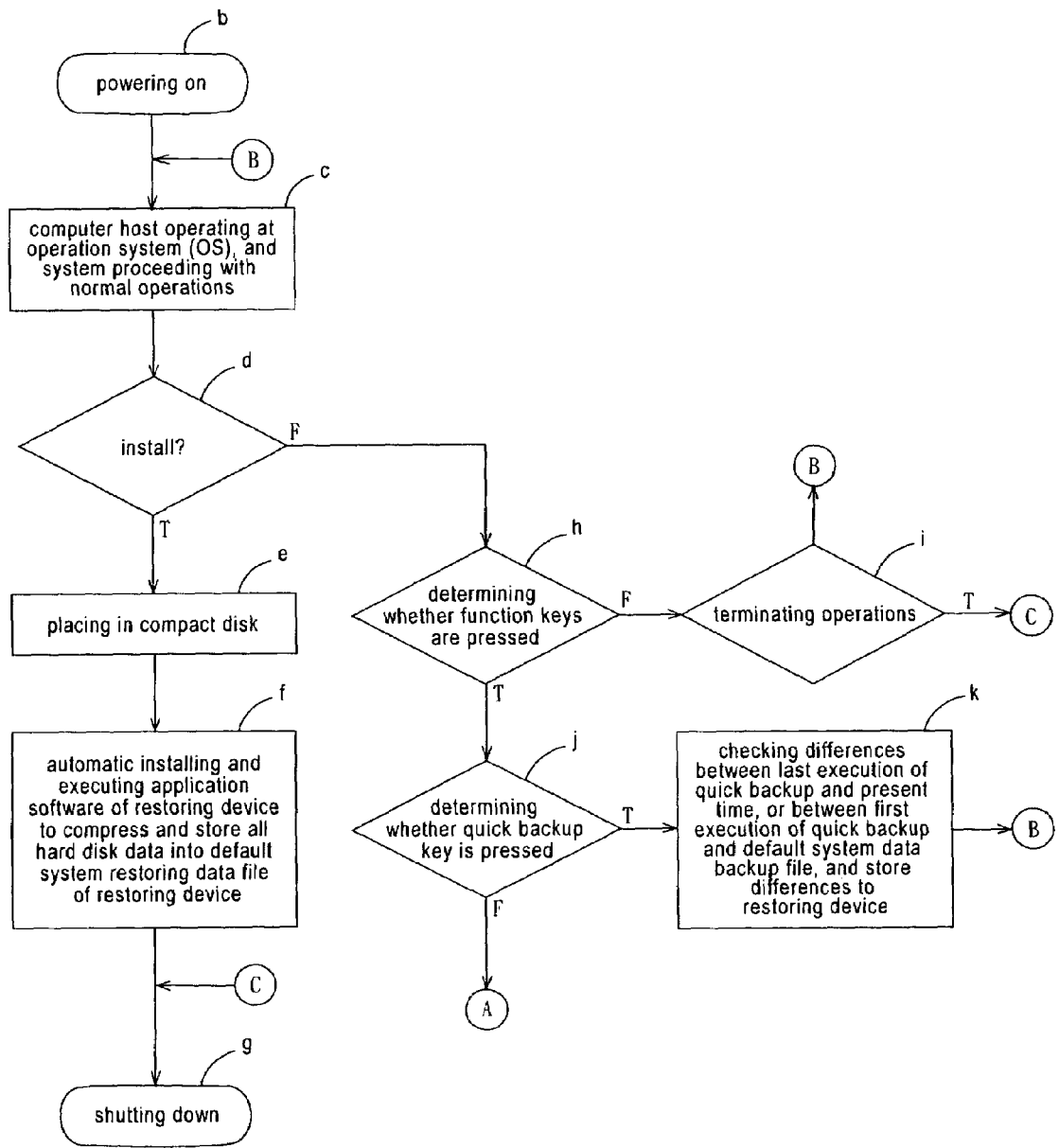
FIGS. 4A and 4B show flow charts according to the invention.
Figure 4B:
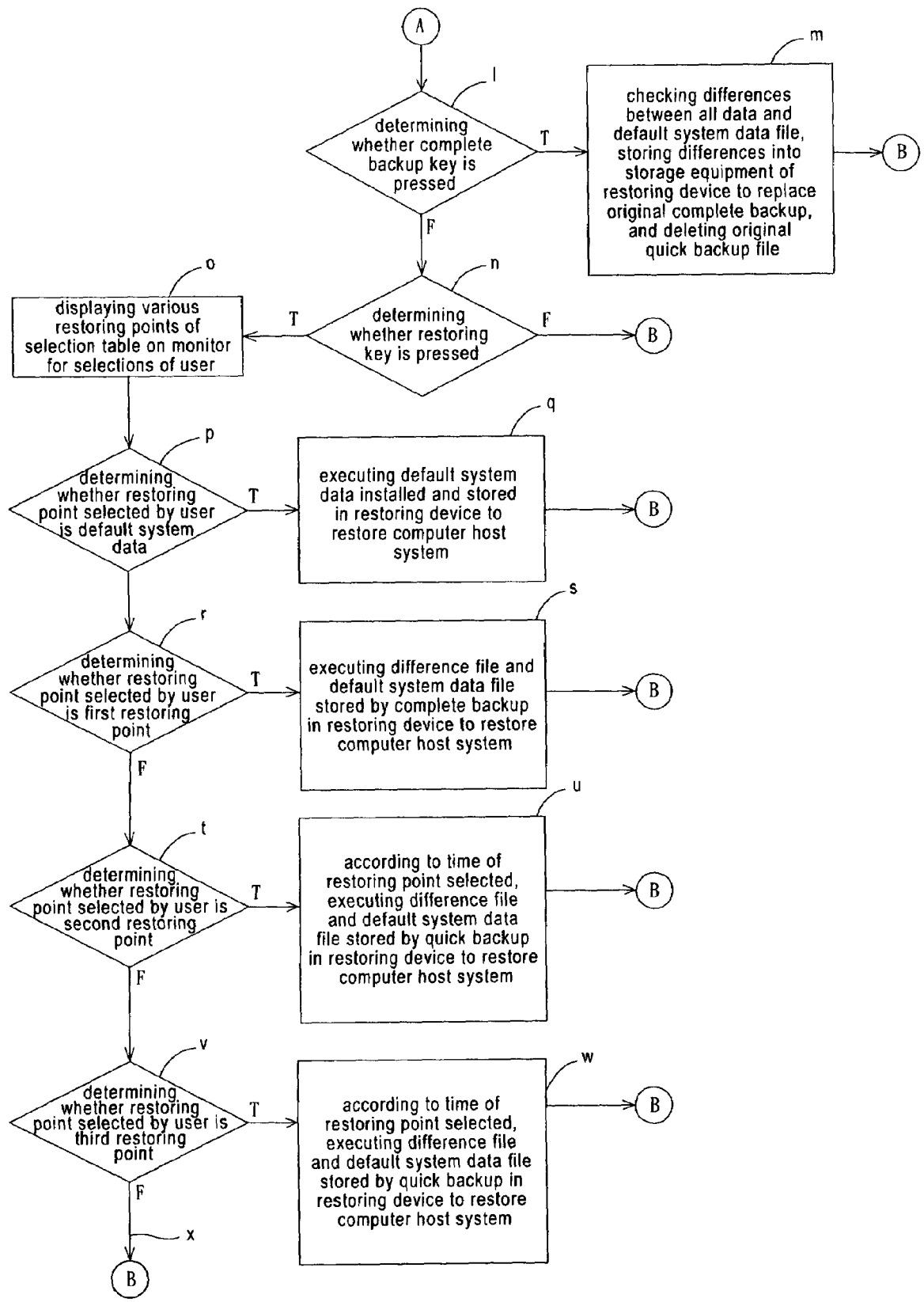

Referring to FIGS. 1, 4A and 4B, a method for restoring computer system data according to the invention comprises the steps of:

a) preparing a restoring device 10 for connecting with a computer host 30, wherein the restoring device 10 is consisted of a casing 11, and function keys including a quick backup key 12, a complete backup key 13 and a restoring key 14;

b) powering on for enabling the computer host 30 to enter operating mode;

c) the computer host 30 operating at operation system (OS), and a system thereof proceeding with normal operations;

d) determining whether or not to proceed with installation and execution of application software of the restoring device 10;

e) if yes, placing in a compact disk with execution of the application software of the restoring device 10;

f) automatic installing and executing the application software of the restoring device 10 to compress and store all hard disk data into the default system restoring data file of the restoring device 10;

g) shutting down;

h) determining whether the function keys of the restoring device 10 are pressed if the computer host 30 already has the application software for executing the computer system data restoring device 10;

i) terminating operations if no function keys are pressed, and returning to step c, or shutting down as step g;

j) determining whether the quick backup key 12 is pressed;

k) if yes, checking differences between last execution of quick backup and the present time, or between first execution of quick backup and the default system data backup file, and store the differences to the restoring device 10; or if not, returning to step c;

l) determining whether the complete backup key 13 is pressed;

m) if yes, checking differences between all data and the default system data file, and storing the differences into a storage equipment of the restoring device to replace the original complete backup, deleting the original quick backup file, and returning to step c;

n) determining whether the restoring key 14 is pressed if the complete backup key 13 is not pressed;

o) if yes, displaying various restoring points of the selection table 20 on the monitor for selections of a user; if not, returning to step c;

p) determining whether the restoring point selected by the user is the default system data;

q) if yes, executing the default system data installed and stored in the restoring device to restore the computer host system, and returning to step c when having completed the execution;

r) if not, determining whether the restoring point selected by the user is a first restoring point;

s) if yes, executing a difference file and the default system data file stored by the complete backup in the restoring device to restore the computer host system, and returning to step c after having completed the execution;

t) if not, determining whether the restoring point selected by the user is the second restoring point;

u) if yes, according to the time of restoring point selected, executing the difference file and the default system data file stored by the quick backup in the restoring device to restore the computer host system, and returning to step c after having completed the execution;

v) if not, determining whether the restoring point selected by the user is the third restoring point; and w) if yes, according to the time of restoring point selected, executing the difference file and the default system data file stored by the quick backup in the restoring device to restore the computer host system, and returning to step c after having completed the execution; and x) if not, returning to step c.

Conclusive from the above, the restoring device 10 according to the invention can be externally connected to a computer host, so as to backup hard disk data into the computer system data restoring device using the method for restoring computer system data using the same device, thereby restoring the computer data using the device in times of situations of the computer host. The structure according to the invention is simple and easily manipulated. Therefore, when a computer has abnormal operations or a crash, a user is not obligated to send the bulky computer for maintenance or have someone come to the house for maintenance, thereby saving manpower and providing economic benefits. The invention has expected benefits as described below.

Suppose:

1. A particular city has a population of one million with every five persons possessing a computer, and each computer is provided with the present device;
2. Each computer crashes three times per year on average;
3. Maintenance fee (including shipping cost) is 2,000 New Taiwan Dollars;

And thus each city is able to spare 2,000*3*1,000,000/5=1,200,000,000 New Taiwan Dollars.

And, suppose:

1. Time need for restoring using the device is one hour;
2. Time needed for round-trip shipping of each maintenance is two hours;
3. Time needed for actual computer maintenance plus waiting time is one day;

Thus each city is able to spare time of (24+2−1)*3*1,000,000/5=15,000,000 hours.

In addition to the above, for irreplaceable damaged data, the practical values offered by the invention cannot be estimated.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A computer system data restoring device comprised:
a casing;
a plurality of function keys disposed on the casing;
a circuit device disposed in the casing, having a central processing unit (CPU), a connection port, a memory, a connection interface, a controller integrated circuit and a data storage device,
wherein the circuit device is electrically connected with the function keys, and connected to an external computer host via the connection port, and
wherein the function keys controlling operations of the controller integrated circuit are used to activate corresponding software in the external computer host via the CPU and the connection port, so as to process and store data from the external computer host into the data storage device, and restore the external computer system data stored in the data storage device to the external computer host.

2. The computer system data restoring device in accordance with claim 1, wherein the function keys include a quick backup key, a complete backup key and a restoring key.

3. The computer system data restoring device in accordance with claim 1, wherein the connection port connected to the CPU is a universal serial bus (USB) interface, a 1394 serial interface, or a super advance technology attachment/advance technology attachment packet (ATA/ATAPI) interface.

4. The computer system data restoring device in accordance with claim 1, wherein the data storage device has an ATA/ATAPI interface.

5. The computer system data restoring device in accordance with claim 1, wherein the data storage device is a hard disk, a memory card, or a compact disk burner.

6. A circuit device of a computer system data restoring device comprising:
   a CPU;
   a connection port;
   a memory;
   a connection interface;
   a controller integrated circuit; and
   a data storage device;
   wherein the circuit device is electrically connected with the function keys, and connected to an external computer host via the connection port, and
   wherein the function keys controlling operations of the controller integrated circuit are used to activate corresponding software in the external computer host via the CPU and the connection port, so as to process and store data from the external computer host into the data storage device, and restore the computer system data stored in the data storage device to the external computer host.

7. A method for restoring computer system data comprising the steps of:
   a) preparing a restoring device for connecting with a computer host, the restoring device consisting of a casing and function keys, the functions keys including a quick backup key, a complete backup key, and a restoring key;
   b) powering on to enable the computer host to enter an operating mode;
   c) operating the computer host in an operation system (OS), the system thereof operating normally;
   d) determining whether or not to proceed install and execute the application software of the restoring device;
   e) if yes, placing a compact disk in the computer host containing the application software of the restoring device;
   f) automatically installing and executing the application software of the restoring device, so as to compress and store all hard disk data into the default system data restoring file of the restoring device;
   g) shutting down;
   h) if the computer host already has the application software for executing the computer system data restoring device, determining whether the function keys of the restoring device are pressed;
   i) if no function keys are pressed, terminating operations and returning to step c, or shutting down as in step g;
   j) determining whether the quick backup key is pressed;
   k) if yes, checking differences between the present and preceeding execution of quick backup, or between the first execution of quick backup and the default system data backup file, and storing the differences to the restoring device; or if no, returning to step c;
   l) determining whether the complete backup key is pressed;
   m) if yes, checking differences between all data and the default system data file, storing the differences into a storage equipment of the restoring device to replace the original complete backup, deleting the original quick backup file, and returning to step c;
   n) if the complete backup key is not pressed, determining whether the restoring key is pressed;
   o) if yes, displaying various restoring points in the selection table on the monitor for selections by a user; or if no, returning to step c;
   p) determining whether the restoring point selected by the user is the default system data;
   q) if yes, executing the default system data installed and stored in the restoring device to restore the computer host system, and returning to step c once execution is completed;
   r) if not, determining whether the restoring point selected by the user is a first restoring point;
   s) if yes, executing a difference file and the default system data file stored by the complete backup in the restoring device to restore the computer host system, and returning to step c after the execution is complete;
   t) if not, determining whether the restoring point selected by the user is the second restoring point;
   u) if yes, according to the time of the restoring point selected, executing the difference file and the default system data file stored by the quick backup in the restoring device in order to to restore the computer host system, and returning to step c after is complete;
   v) if not, determining whether the restoring point selected by the user is the third restoring point;
   w) if yes, according to the time of restoring point selected, executing the difference file and the default system data file stored by the quick backup in the restoring device to restore the computer host system, and returning to step c after the execution is complete; and
   x) if not, returning to step c.

8. the computer system data restoring device in accordance with claim 2, wherein the restoring dey is used to activate the display of a selection table including various restoring points used for restoring to the external computer host.

* * * * *